March 24, 1964  J. BOWE  3,125,967
CONTROLS FOR CANDY COTTON MACHINE
Filed Aug. 16, 1961
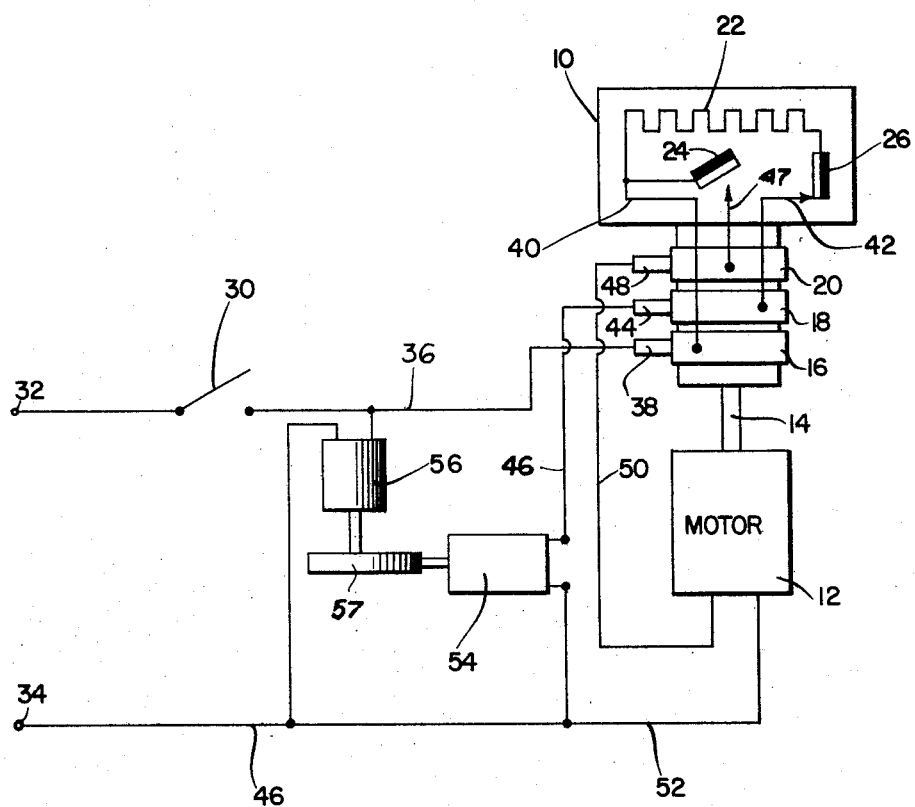
INVENTOR.
JOHN BOWE
BY Morse + Altman
ATTORNEYS

United States Patent Office 3,125,967
Patented Mar. 24, 1964

3,125,967
CONTROLS FOR CANDY COTTON MACHINE
John Bowe, 29 Maple St., Salisbury, Mass.
Filed Aug. 16, 1961, Ser. No. 131,783
3 Claims. (Cl. 107—8)

This invention relates to the operation of machines of the type shown in U.S. Patent No. 1,489,342 for spinning sugar into fine filaments to be gathered as "candy cotton." When such a machine is shut down after use, the sugar next to the heating unit hardens as the heating unit cools. When the machine is next operated, it is customarily started by closing a switch which results in simultaneously energizing the spinner head motor and the heating units in the spinner head. Unless the spinner head has been washed in the meantime, the hardened sugar next to the heating unit comes loose as the heating unit heats up and breaks into small bits which are discharged centrifugally from the rotating head. It often happens that some of these partly melted bits of sugar develop a sharp point as they fly from the head. Such points are a hazard to the consumer of the cotton candy and they are apt to puncture the gums or mouth lining of the consumer. It is an object of the present invention to avoid this danger by the use of automatic controls for putting the machine into operation in such a way that sugar "thorns" are not formed, and at the same time overheating of the heating units in the spinner head is prevented.

For this purpose I provide a thermostatically operated switch which is open when cold and which closes when the thermostat reaches a predetermined temperature. This switch is connected in the motor circuit so that rotation of the spinner head does not commence until the heating units are up to operational heat. Additional means are provided for preventing overheating of the heating units.

For a more complete understanding of the invention, reference may be had to the following description thereof and to the drawing which illustrates a wiring diagram of circuits by which the operation of a candy spinning machine can be controlled. Conventionally indicated on the drawing is a sugar spinner head 10 driven by an electric motor 12 connected to it by a shaft 14 on which are three slip rings 16, 18, 20. The spinner head 10 has a heating unit 22 and a thermostatic switch 24 located near the heating unit. This switch is open when cooler than a predetermined temperature and closed when above that temperature. A second thermostatic switch 26 may be mounted near the heating unit 22, this switch being normally closed but being adjusted to open when the temperature of the heating unit exceeds a predetermined value and to close when the temperatures of the heating unit falls below that value. A main switch is indicated at 30.

The heater 22 may be connected to a convenient source 32, 34 of electric power as follows. From the contact 32 a wire 36 leads through the main switch 30 to a brush 38 on the slip ring 16. This ring is connected by a wire 40 to an end of the heater unit 22. The other end of the heater unit is connected by a wire 42 to the slip ring 18. A brush 44 on this ring is connected by a wire 46 to the other power contact 34.

The motor circuit leads from the power contact 32 through the main switch 30, the wire 36, the brush 38, the slip ring 16 and the wire 40 to the thermostatic switch 24. This switch is connected by a wire 47 to the slip ring 20 on which is a brush 48 connected by a wire 50 to one connecting post of the motor 12. The other connecting post of the motor is connected by a wire 52 to the power contact 34 through part of the wire 46.

The operation of the apparatus thus far described is as follows. To put the machine into operation, the main switch 30 is closed. This energizes the heating unit 22. This soon comes up to operative temperature because the switch 24 being open, the spinner head 10 is not rotating and thus fanning the heater unit. When the heating unit has attained the predetermined temperature for which the switch 24 was set, the switch closes, thus starting the motor 12 which rotates the head 10. If the temperature of the heating unit 22 at any time exceeds a predetermined value for which the switch 26 is set, this switch opens and breaks the heater circuit without interrupting the operation of the motor.

As an alternative to the switch 26 for the prevention of overheating, a timer switch 54 may be connected into the heater circuit between the brush 44 and the junction with the wire 52. This switch is operated by known motor-driven mechanism to open and close at adjustably predetermined intervals, a motor for this purpose being indicated at 56 to rotate a cam 57 which operates the timer switch 54. The off periods allow the heater unit to cool sufficiently to prevent overheating.

I claim:

1. In a candy cotton machine including a spinner head, a heating unit within said head, and a motor for driving said head; a circuit connecting said heating unit in series with a source of electric power, a parallel circuit connecting said motor to said source of electric power, a main switch controlling both said circuits, a thermostat in said head near to said heating unit, an auxiliary switch connected in said parallel circuit with said motor and controlled by said thermostat to open when the temperature of the thermostat is lower than a predetermined value and to close when the temperature of the thermostat exceeds said value, a second thermostat in said head, and a switch in series with said heating unit controlled by said second thermostat to open when the temperature of the second thermostat exceeds a predetermined value and to close when the temperature of said second thermostat falls below the said predetermined value.

2. Mechanism as described in claim 1, a timer switch in series with said heater unit, and means for opening and closing said timer switch at regular predetermined intervals.

3. In a candy cotton machine including a spinner head, a heating unit within said head, and a motor for driving said head; a circuit connecting said heating unit in series with a source of electric power, a parallel circuit connecting said motor to said source of electric power, a main switch controlling both said circuits, a thermostat in said head near to said heating unit, an auxiliary switch connected in said parallel circuit with said motor and controlled by said thermostat to open when the temperature of the thermostat is lower than a predetermined value and to close when the temperature of the thermostat exceeds this value, a timer switch in series with said heating unit, and means for automatically opening and closing said timer switch at regular predetermined intervals.

References Cited in the file of this patent

UNITED STATES PATENTS

| | | |
|---|---|---|
| 1,489,342 | Brent | Apr. 8, 1924 |
| 1,806,111 | Moad | May 19, 1931 |
| 2,398,880 | Broglie | Apr. 23, 1946 |